Aug. 6, 1940.　　　　　E. A. HORN　　　　2,210,171
ELECTRIC TROLLEY CONSTRUCTION
Filed July 23, 1938　　　2 Sheets-Sheet 1

INVENTOR
EMIL A. HORN
BY HIS ATTORNEYS

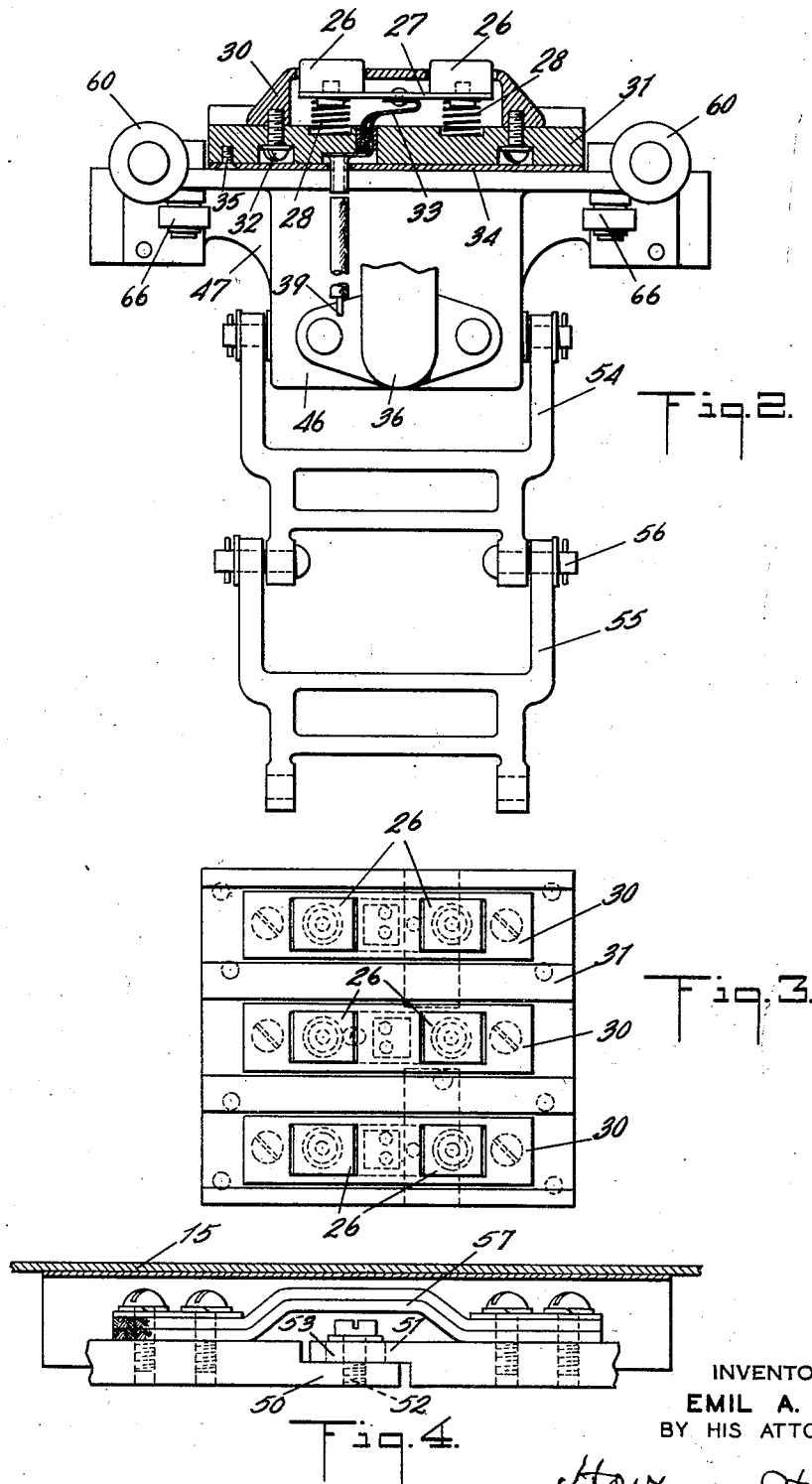

Patented Aug. 6, 1940

2,210,171

UNITED STATES PATENT OFFICE 2,210,171

ELECTRIC TROLLEY CONSTRUCTION

Emil A. Horn, Jamaica, N. Y., assignor to Feedrail Corporation, New York, N. Y., a corporation of New York Application July 23, 1938, Serial No. 220,970

7 Claims. (Cl. 191—23)

This invention relates to electric trolley construction of the type disclosed in Glasgow Patent No. 2,026,884 on which the present invention is an improvement.

The main objects of the present invention are to adapt the construction for heavier current, including larger bus bars, greater spacing and consequent larger conduit, to facilitate assembly and provide for expansion, adapt the construction for low level installation, provide lateral draft means and overload protection for the trolley and improve the trolley contact provisions for engaging the bus bars.

Other objects and features of novelty will be apparent as the following description proceeds, reference being had to the accompanying drawings, in which Figure 1 is a transverse section through a conduit according to the present invention showing the carriage therein in end elevation;

Figure 2 is a side elevation of the carriage of Figure 1, the brush housing and insulating base being shown in section;

Figure 3 is a top plan view of the insulating base and brush housing, and

Figure 4 is a detail of the expansion joint.

Figure 1:
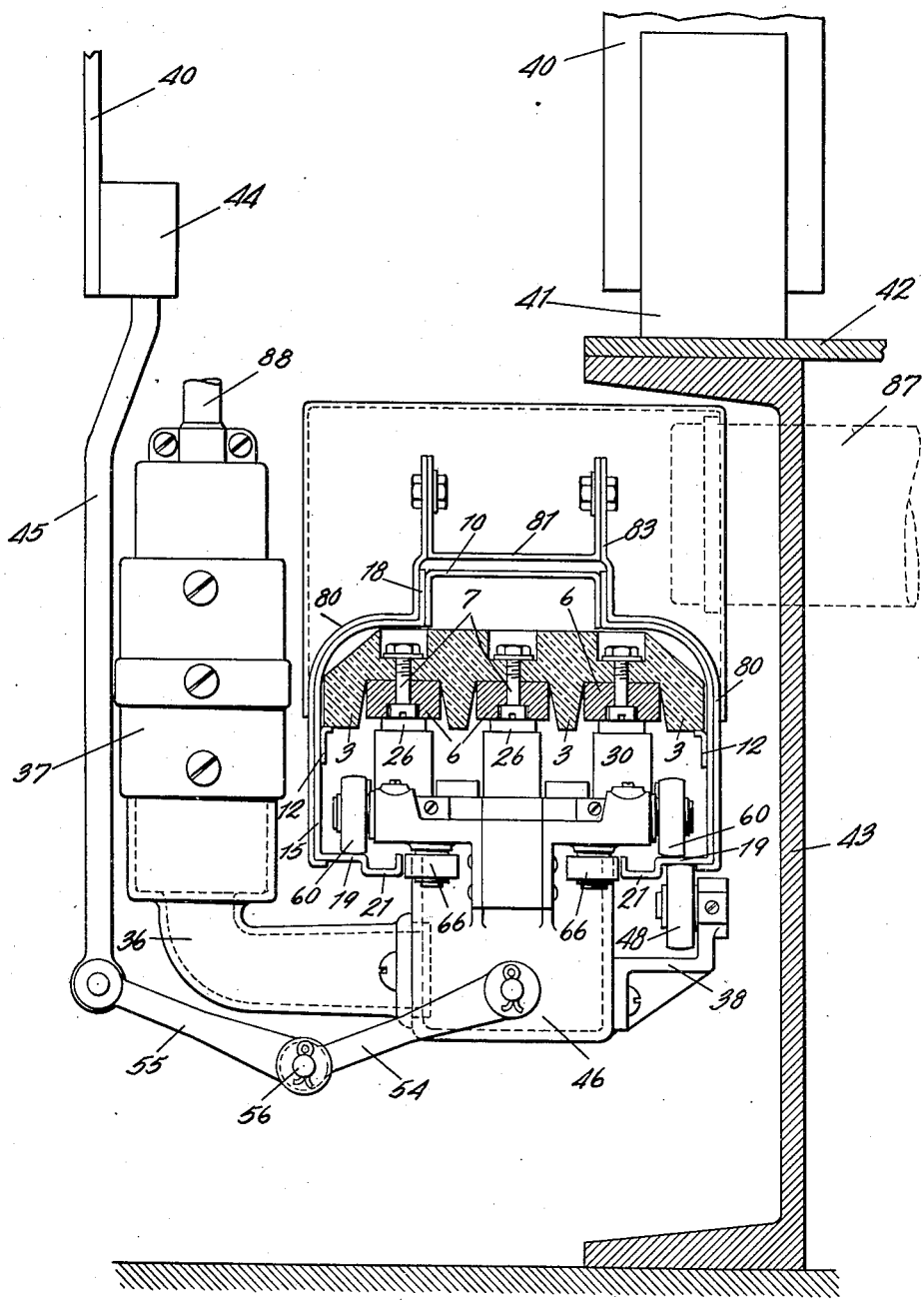

The electric trolley construction according to the preferred embodiment of the present invention comprises an insulating member having bus bars secured thereto and complementary conduit members mounted at each side thereof, forming a conduit inclosing the bus bars, but spaced therefrom. The conduit also contains a carriage which moves longitudinally therein, and is provided with contacts engaging the bus bars.

The conduit is manufactured in sections or units, which are adapted to be joined in end to end relation to form a continuous conduit of a length to suit the installation.

Referring more particularly to the drawings, as shown in Figure 1 an insulator forming a hanger or panel 2 is provided, which may be conveniently molded of Bakelite, but may be constructed as desired from any other material. The under side of the member 2 is provided with grooves defined by ridges 3, in which grooves are respectively mounted bus bars 6. The insulating member 2 and the bus bars 6 have registering bolt holes, respectively counterbored to receive heads of bolts 7. The bolt hole and counterbore of the insulators or the bus bars or both may be elongated longitudinally to permit relative sliding movement.

The conduit comprises a sheet metal casing formed of complementary side members 15 and 16 having parallel side walls and terminating in inwardly directed flanges 19. The inner edges of the flanges 19 are spaced apart thus leaving the trolley slot 20. The flanges 19 adjacent the slots 20 are provided with reinforcing grooves or channels 21.

The side members 15 and 16 are connected by a conduit spacer member 10, forming with the side members the conduit which incloses the bus bars and insulating members. In the form shown, the side members have vertical flanges 18, and the spacer 10 is a sheet metal channel having flanges secured to the flanges 18, for example by spot welding. It will be readily apparent that by increasing the width of the spacer 10 the same complementary side members 15 and 16 may be used to construct conduits of larger sizes and slot widths. Also the flanges of the spacer channel 10 increase the moment of inertia of the conduit section and strengthen it against bending.

The bus bars 6 are preferably bolted to the spaced insulators 2 as an assembly unit for insertion longitudinally into the conduit casing. The insulators preferably conform to the shape of the conduit, which in the form shown includes the inside of the rounded upper parts of the side members 16 and 17, and the under side of spacer 10. To retain the insulators in position, abutments are secured to the casing walls, which in the form shown comprise small angle bars 12 spot welded to the side walls of members 15 and 16, over which the insulators 2 slide longitudinally.

For joining the conduit sections, coupling plates 80 are provided, similar to those of the Glasgow patent, coupling spacer channels 81 being interposed between the upper flanges 83 thereof. A center feed box 85 is let down over notched out central portions of the coupling plates. Power supply leads (not shown) enter the center feed box through conduit 87, and are respectively connected to the bus bars. As shown in Figure 4 a longitudinally sliding expansion joint is provided, one in each of the bus bars. The top of one bus bar end is cut away for half its thickness, leaving a tongue 50, and the bottom of the other is similarly cut away leaving a tongue 51. These tongues are bolted together by a bolt 52, the bolt hole in the tongue 51 being elongated longitudinally as at 53. The bus bar ends are bonded around the expansion joint, a flexible connector 57 being bolted to both bus bar ends on the side opposite from the contact surface of the bus bars.

The trolley carriage which operates in the conduit just described comprises a frame 47 shown as a casting, but which may be of sheet metal construction. This frame carries four supporting rollers 60 which roll on the track portions 19, and has side rollers 66 which bear against the channels 21. A portion 46 of the carriage frame extends down into the slot 20. As shown in Figures 2 and 3 the frame 47 carries an insulating base 31 on which are mounted brush housings 30 secured thereto by screws 32. Brushes 26 project upwardly through tandem holes in the housing 30 and are mounted on a bridge 27 inside the housing. Springs 28 interposed between the bridge and the base 31 urge the brushes 26 up through the housing apertures.

A flexible connector 33 is connected to each brush, for example, being riveted to the bridge 27, and passes through holes in the insulating base 31 and the backing plate 34 which is secured to the insulating base by screws 35.

It should be noted that the carriage contact mounting is very simple in construction, for convenience in assembly and overhaul. The backing plate is removed by taking out the screws 35, and any selected brush housing may be released by removing the screws 32. This releases the entire brush contact mechanism for inspection or overhaul.

A hollow bracket 36 is secured to the side of carriage portion 46, and has an upwardly extending portion which carries a fuse carrier 37, details of which are disclosed in Novak Patent No. 2,049,309. A bracket 38 is secured to the opposite side of the carriage portion 46 and carries an under roller 48 which bears against the underside of the track portion 19, to balance the weight of the fuse holder and hollow bracket 36.

Suitable insulated conductors 39 connect the flexible connector 33 to the fuse clips of the holder 37. A cable 88 from the electrical device supplied by the carriage passes through the strain relief fitting of the fuse holder, and is suitably connected to the other fuse clips thereof.

The arrangement shown in Figure 1 is particularly adapted for a low level installation, where the conduit is mounted close to the factory floor, to serve electrical devices thereabove. The electrical device is on a carriage 40 supported by a roller 41 on a track 42 carried by a beam 43. A part of the carriage 40 has a sleeve 44 which receives a sliding bar 45.

Flexible draft means is provided to drive the trolley carriage along the conduit from the carriage 40. A link 54 is pivoted to the carriage portion 46 and another link 55 is pivoted to the bar 45, the two links being pivoted together at 56. This form of draft means is longitudinally rigid but transversely flexible to accommodate variations in the distance of the bar 45 or other part of the carriage 40, from the trolley carriage 46 or the slot 20. However other forms of chain may be employed, as the longitudinal rigidity of the draft means is not essential.

This invention is not limited to the precise details disclosed, but instead includes such modifications thereof as fall within the scope of the appended claims.

I claim:

1. In an electric conduit construction, an insulating member, bus bars mounted on said insulating member, complementary conduit members having side walls spaced from said bus bars and terminating in inwardly directed flanges spaced apart to form a slot, and cooperating abutment means secured to the inside of said respective complementary members in oppositely disposed relation and engaging but not perforating said insulating member to retain the same inside the conduit in longitudinally slidable relation and for supporting said insulating member in the conduit to locate said bus bars in position with respect to said slot to permit the passage therebetween of a carriage having supporting rollers engaging said flanges and contacts engaging said bus bars, in combination with a conduit member connecting said complementary members and spacing said side walls and increasing the width of said slot, whereby the same complementary members may be used to form conduits of larger sizes and slot widths with their cooperating abutments supporting said insulating member extending from one of said complementary members to the other and bridging the space provided by said spacer member.

2. In an electric conduit construction, an elongated sheet metal casing having a longitudinal slot and track portions parallel thereto, an insulating member having a plurality of longitudinally extending parallel bus bars secured thereto in spaced relation and exposed on one side of said insulating member, the other side of said insulating member engaging the inner side of the wall of said casing, and abutment means secured to said casing wall and slidably engaging under the side edges of said insulating member to retain the same against the wall of the casing, said insulating member retaining said bus bars transversely spaced from each other and from said casing, each bus bar having a longitudinally sliding joint therein including longitudinally sliding surfaces maintained in contact, in combination with bonding means comprising a flexible connector on the side of said bus bars away from their contact surfaces and secured to both of the joined bus bars, said slidable mounting of said insulators in said casing being constructed and arranged for longitudinal movement, whereby the amount of expansion localized at said joints may be distributed over the several insulated supports.

3. In an electric trolley construction, an elongated sheet metal casing having a longitudinal slot and track portions parallel thereto and a plurality of longitudinally extending parallel bus bars inside said casing and insulated therefrom, a carriage adapted to be inserted in said conduit for rolling along said track portions and having contacts engaging said bus bars and a central depending portion adapted for riding in said slot, in combination with a propelling member moving generally longitudinally with respect to said slot but laterally spaced therefrom, and draft means connecting said carriage to said propelling member, said draft means comprising a yoke having arms pivoted to the front and rear of said depending portion, and another yoke pivoted to the first yoke and to said propelling member on axes parallel to the first pivots, said draft means being transversely flexible to accommodate variation in the distance of said propelling member from said carriage and longitudinally rigid to prevent variation in lag of said carriage with respect to said propelling member.

4. In an electric trolley construction, an elongated sheet metal casing having a longitudinal slot and track portions parallel thereto and a plurality of longitudinally extending parallel bus bars inside said casing and insulated therefrom, a carriage adapted to be inserted in said conduit for rolling along said track portions and having contacts engaging said bus bars and a central depending portion adapted for riding in said slot, in combination with a propelling member moving generally longitudinally with respect to said slot but laterally spaced therefrom, and draft means connecting said carriage to said propelling member, said draft means comprising a yoke having arms pivoted to the front and rear of said depending portion, and another yoke pivoted to the first yoke and to said propelling member on axes parallel to the first pivots, said draft means being transversely flexible to accommodate variation in the distance of said propelling member from said carriage and longitudinally rigid to prevent variation in lag of said carriage with respect to said propelling member, in combination with rigid permanent support means extending upward from said rigid central depending portion and means for maintaining said support means at all times adjacent the side walls of said casing and carrying overload protection means for the circuits of said bus bars.

5. In an electric trolley construction, an elongated sheet metal casing having a longitudinal slot and track portions parallel thereto and a plurality of longitudinally extending parallel bus bars inside said casing and insulated therefrom, a carriage adapted to be inserted in said conduit for rolling along said track portions and having contacts engaging said bus bars and a central depending portion adapted for riding in said slot, in combination with a propelling member moving generally longitudinally with respect to said slot but laterally spaced therefrom, and draft means connecting said carriage to said propelling member, said draft means comprising a yoke having arms pivoted to the front and rear of said depending portion, and another yoke pivoted to the first yoke and to said propelling member on axes parallel to the first pivots, said draft means being transversely flexible to accommodate variation in the distance of said propelling member from said carriage and longitudinally rigid to prevent variation in lag of said carriage with respect to said propelling member, in combination with support means rigidly secured to said central depending portion and permanent means for maintaining said support means at all times adjacent the side walls of said casing and carrying overload protection means for the circuits of said bus bars, and an underroller carried by said carriage outside portion opposite said overload protection means and engaging the underside of the adjacent track portion to balance the load thereof.

6. In an electric trolley construction, for use in an elongated sheet metal casing having a longitudinal slot and track portions parallel thereto, and having a plurality of longitudinally extending parallel bus bars mounted in said casing and insulated therefrom and from each other, a carriage for rolling along said track portions, an insulating base on said carriage, a removable brush housing for each bus bar secured to said insulating base and having a pair of spaced tandem apertures therein, a brush support inside said housing, a pair of spaced tandem brushes on said support projecting through said apertures respectively, spring means between said support and said base for urging said support outwardly to bring its portion between said brushes into engagement with said housing between said apertures only when said brushes are unopposed, and for urging said brushes when in operative position outwardly into contact with their bus bar, means for securing said removable brush housing in position and simultaneously compressing said spring, and flexible conductor means connected to said brush and extending down through said base and carriage and out through said slot.

7. In an electric trolley construction for use in an elongated sheet metal casing having a longitudinal slot and track portions parallel thereto, and having a plurality of longitudinally extending parallel bus bars mounted in said casing and insulated therefrom and from each other, a carriage for rolling along said track portions, an insulating base on said carriage, a brush housing for each bus bar secured to said insulating base and having tandem apertures therein, a pair of brushes projecting through said apertures, a bridge inside said housing supporting said brushes, and spring means between each bridge and said base for urging said brushes outwardly through said apertures into contact with said bus bars.

EMIL A. HORN.